(12) United States Patent
McCormick (10) Patent No.: US 11,519,655 B2
(45) Date of Patent: Dec. 6, 2022

(54) THERMAL ENERGY STORAGE AND RETRIEVAL SYSTEMS AND METHODS

(71) Applicant: Photon Vault, LLC, San Ramon, CA (US)

(72) Inventor: Kentwell Lee McCormick, San Ramon, CA (US)

(73) Assignee: PHOTON VAULT, LLC, San Ramon, CA (US)

( * ) Notice: Subject to any disclaimer, the term of this patent is extended or adjusted under 35 U.S.C. 154(b) by 211 days.

(21) Appl. No.: 16/945,281

(22) Filed: Jul. 31, 2020

(65) Prior Publication Data

US 2022/0034572 A1 Feb. 3, 2022

(51) Int. Cl.
*F25D 3/02* (2006.01)
*F25D 3/00* (2006.01)

(52) U.S. Cl.
CPC ............... *F25D 3/02* (2013.01); *F25D 3/005* (2013.01)

(58) Field of Classification Search
CPC .................. F24F 5/0017; F24F 5/0021; F24F 2005/0032; F24F 1/00; F25D 16/00; F25D 3/005; F25B 25/005; F24D 3/02; F28D 20/021; F28D 20/028; F25C 1/08
See application file for complete search history.

(56) References Cited

U.S. PATENT DOCUMENTS

| | | |
|---|---|---|
| 3,626,149 A | 12/1971 | Carney |
| 3,981,294 A | 9/1976 | Deminet |
| 4,114,599 A | 9/1978 | Stephens |
| 4,117,831 A | 10/1978 | Bansal |
| 4,200,148 A | 4/1980 | Friefeld |
| 4,210,201 A | 7/1980 | O'Hanlon |
| 4,257,398 A | 3/1981 | Watson |
| 4,257,481 A | 3/1981 | Dobson |

(Continued)

FOREIGN PATENT DOCUMENTS

| | | |
|---|---|---|
| CA | 3019409 A1 | 3/2020 |
| CN | 202734275 U | 2/2013 |

(Continued)

OTHER PUBLICATIONS

Search Report and the Written Opinion dated Nov. 5, 2021 in PCT/US2021/039289.

(Continued)

*Primary Examiner* — Ana M Vazquez
(74) *Attorney, Agent, or Firm* — Davis Malm D'Agostine, P.C.; David J. Powsner (57) ABSTRACT

The invention provides, in some aspects, a thermal energy storage and retrieval system with a cavity containing a working fluid and a heat transfer surface disposed in the cavity transverse to a gravity field and in thermal coupling with an ice that is formed from and floating in the working fluid. The heat transfer surface transfers to that ice heat from a heat transfer medium that is thermally coupled to the heat transfer surface. According to aspects of the invention in which the ice is less dense than the working fluid, the heat transfer surface is disposed above (with respect to the gravity field) a region of the cavity where that ice is formed or inlet. According to aspects of the invention in which the ice is more dense than the working fluid, the heat transfer surface is disposed below that region.

10 Claims, 6 Drawing Sheets

(56) References Cited

U.S. PATENT DOCUMENTS

| | | | |
|---|---|---|---|
| 4,373,513 | A | 2/1983 | Materna |
| 5,069,199 | A | 12/1991 | Messner |
| 9,932,830 | B2 | 4/2018 | Laughlin |
| 10,288,357 | B2 | 5/2019 | Laughlin et al. |
| 2008/0156314 | A1 | 7/2008 | Heuer |
| 2009/0095282 | A1 | 4/2009 | Cramer |
| 2009/0194257 | A1* | 8/2009 | Niu ................. F28D 20/021 165/104.17 |
| 2010/0314081 | A1 | 12/2010 | Reis |
| 2012/0060501 | A1 | 3/2012 | Hemrle |
| 2012/0199331 | A1 | 8/2012 | Maurer |
| 2012/0312292 | A1 | 12/2012 | Bahl |
| 2014/0060051 | A1 | 3/2014 | Ohler |
| 2016/0108761 | A1 | 4/2016 | Frazier |
| 2016/0160864 | A1 | 6/2016 | Becquin |
| 2017/0275190 | A1 | 9/2017 | Eziyi |
| 2019/0331098 | A1 | 10/2019 | von Behrens |
| 2020/0132313 | A1* | 4/2020 | Yoshino ............ F24F 1/0022 |

FOREIGN PATENT DOCUMENTS

| | | |
|---|---|---|
| CN | 210154394 U | 3/2020 |
| DE | 10341299 | 3/2005 |
| DE | 102009014235 A1 | 9/2010 |
| EP | 2241737 | 10/2010 |
| JP | 11294983 A * | 10/1999 |
| JP | H11-294983 A | 10/1999 |
| JP | 2001-66081 A | 3/2001 |
| JP | 2007-85672 A | 4/2007 |
| WO | 2012114229 | 8/2012 |
| WO | WO 2012/140015 A1 | 10/2012 |
| WO | WO 2015/129456 A1 | 9/2015 |

OTHER PUBLICATIONS

U.S. Appl. No. 16/928,352, filed Jul. 14, 2020, Multi-Temperature Heat Pump for Thermal Energy Storage.

U.S. Appl. No. 17/012,621, filed Sep. 4, 2020, Thermal Energy Storage and Retrieval System.

U.S. Appl. No. 17/093,063, filed Nov. 9, 2020, Multi-Temperature Heat Collection System.

Chemistry and Physics of Carbon, v. 1, Editor: Peter Thrower, Publ: Marcel Dekker, Inc. (1989) pp. 1-6.

Encyclopedic Dictionary of Condensed Matter Physics, v. 1, Charles P. Poole, Elsevier Ltd. (2004), pp. 530-533.

The Physical Chemistry of Materials—Energy and Environmental Applications (2010), Roque-Malherbe, CRC Press, pp. 86-88.

The Structure and Properties of Artificial and Natural Graphite, Neubert, et al, Argonne National Laboratory (1955) pp. 18-24.

"Designing a novel solar-assisted heat pump system with modification of a thermal energy storage unit", Proceedings of the Institution of Mechanical Engineers Part A Journal of Power and Energy, May 2019.

"Using Sand and other Small Grained Materials as Heat Storage Medium in a Packed Bed HTTESS", Schlipf et al., Energy Procedia, v. 69, pp. 1029-1038 (2015).

"The Rayleigh-Benard problem in extremely confined geometries with and without the Soret effect," Platten et al., Comptes Rendus Mecanique, Elsevier Masson, 2007, 335 (9-10), pp. 638-654.10. 1016/j.crme.2007.08.011. hal-01946148.

International Search Report dated Dec. 8, 2021 for PCT/US21/39288, 7 pages.

International Search Report dated Dec. 14, 2021 for PCT/US21/39290, 20 pages.

International Search Report dated Sep. 13, 2021 in PCT/US2021/039287.

* cited by examiner

THERMAL ENERGY STORAGE AND RETRIEVAL SYSTEMS AND METHODS

FIELD OF THE INVENTION

The invention relates to a thermal energy storage and retrieval systems and methods that utilize phase change materials.

BACKGROUND OF THE INVENTION

Energy storage is a critical capability for regulating the energy supply. Renewable energy sources are often intermittent and supply either too little or too much power relative to demand. Leveling out the supply of energy requires a mechanism to store and retrieve energy. Thermal energy in phase change materials is an attractive option because a large amount of heat can be stored in a relatively small volume. However, containing material in the solid phase and ensuring sufficient heat transport into and out of a solid material during the charging/discharging cycle is a significant engineering challenge. Thermal performance typically degrades with both the amount of stored thermal energy and with extended numbers of thermal cycles.

An object of the invention is to provide improved systems and methods for storage and retrieval of thermal energy.

A further object is to provide such systems and methods as can be implemented and operated at low cost.

A still further object of the invention is to provide such systems and methods as are durable and can be operated reliably.

SUMMARY OF THE INVENTION

The foregoing are among the objects attained by the invention, which provides in some aspects a thermal energy storage and retrieval system with a cavity containing a working fluid and a heat transfer surface disposed in the cavity transverse to a gravity field and in thermal coupling with an ice that is formed from and floating in the working fluid. The heat transfer surface transfers heat to that ice from a heat transfer medium that is thermally coupled to the heat transfer surface. According to aspects of the invention in which the ice is less dense than the working fluid, the heat transfer surface is disposed above (with respect to the gravity field) a region of the cavity where that ice is formed or inlet. According to aspects of the invention in which the ice is more dense than the working fluid, the heat transfer surface is disposed below that region.

Related aspects of the invention provide systems and methods, e.g., as described above, in which the heat transfer medium is a fluid such as, for example, isobutane.

Further related aspects of the invention provide systems and methods, e.g., as described above, in which the heat transfer medium flows through the heat transfer surface to exchange heat with the ice. This can be, according to some aspects of the invention, via channels in the heat transfer surface.

Other aspects of the invention provide systems and methods, e.g., as described above, that include a pumpable ice machine that is disposed outside but in fluid coupling with the cavity to make ice from working fluid. The pumpable ice machine can take that working fluid from an outlet of the cavity and inlet the resulting ice to the cavity via a cavity inlet in the aforesaid region. In related aspects of the invention, the pumpable ice machine produces the ice as part of a slurry of ice and working fluid.

Still other aspects of the invention provide systems and methods, e.g., as described above, that utilize a cold plate disposed in the aforesaid region of the cavity transverse to the gravity field to form the ice. In related aspects of the invention, that cold plate can be heated to release ice buildup and, thereby, release that ice into the working fluid of the cavity.

Related aspects of the invention provide systems and methods, e.g., as described above, in which the working fluid is water.

Still other aspects of the invention provide systems and methods, e.g., as described above, in which the heat transfer surface is disposed below a surface of the working fluid in the cavity, if the ice is less dense than the working fluid, and otherwise is disposed above a bottom of the cavity. According to related aspects of the invention, the heat transfer surface includes at least one recess to capture ice of the working fluid floating in the working fluid. This prevents the ice from reaching the surface of the working fluid, if the ice is less dense than the working fluid, and otherwise (i.e., if the ice is more dense) prevents the ice from reaching the bottom of the cavity.

Yet still other aspects of the invention provide systems and methods, e.g., as described above, operable in (i) a charging mode in which ice is aggregated within the cavity, and (ii) in a discharging mode in which heat from the heat transfer medium is transferred to the aggregated ice to cool the heat transfer medium and to convert the ice to working fluid.

The foregoing and other aspects of the invention are evident in the drawings and in the discussion that follows this summary.

BRIEF DESCRIPTION OF THE DRAWINGS

A more complete understanding of the invention may be attained by reference to the drawings, in which.

DETAILED DESCRIPTION OF THE PREFERRED EMBODIMENT

Overview

Energy storage systems according to the invention consume energy to freeze a working fluid to its solid or "ice" form and, subsequently, use that ice to extract heat from a heat transfer medium. The systems take advantage of gravity and of the relative densities of the working fluid's liquid and solid (ice) forms to move the ice within a cavity and to keep the melting ice in thermal contact with the transfer medium as heat is being extracted from it.

Systems according to the invention have application, by way of non-limiting example, in industrial, and commercial and residential cooling, where excess electrical energy available during nights and other off-peak hours can be used to freeze the working fluid into an ice which is subsequently used in peak hours to cool equipment, materials or the environmental air of buildings and homes. Systems according to the invention can also be used for applications in which the ice is created, e.g., from electrical energy, concurrently with its being used to extract heat from industrial, commercial and/or residential systems.

In practice, systems according to the invention have a cavity to contain the working fluid, a heat transfer surface that is disposed across the cavity to capture the ice and insure its absorption of heat from the heat transfer medium, and a mechanism to create that ice from the working fluid in the cavity. Two such mechanisms are described in the embodiments below, though, the invention contemplates others. In the first, the solid phase material or ice is pumped into the cavity from an external system that condenses the working fluid. (Here, and in the discussion that follows, formation of the ice or solid phase of the working fluid is alternatively referred to as "freezing" or "condensing"). In the second mechanism, the working fluid is condensed onto a surface in the cavity. Once a suitable quantity of solid phase material has been created, it is released by slightly heating that surface. The process can be repeated any number of times to create a sufficient volume of solid material.

In both mechanisms, the heat transfer surface is positioned in the cavity and shaped in such a way that it (i) captures and contains the solid phase as it floats up or down (depending on the relative densities of the working fluid and its ice) in the working fluid, and (ii) remains in contact with that solid phase as it melts. In embodiments where the solid phase is more dense than the surrounding liquid working fluid in the cavity, the heat transfer surface resides below where the solid phase is formed or inlet. In cases where the solid phase is less dense (as is the case, for example, in embodiments where water serves as the working fluid), the heat transfer surface resides above where the solid phase is formed or inlet. By so positioning the heat transfer surface and, for example, cupping its surface (or otherwise providing it with recesses), the melting ice will remain in continuous contact with the heat transfer surface thereby increasing the heat transfer rate through a process known in the art as continuous contact melting.

Described below and illustrated in the drawings are systems and methods of their operation according to the invention that store solid phase material and absorb thermal energy to convert the solid phase material to the liquid phase. Depending on application, these systems can be operated to form the solid phase material in the cavity simultaneously with or independently of the absorption of thermal energy (e.g., from industrial, commercial and/or residential systems) to melt the solid phase material.

Advantages of thermal energy storage and retrieval systems according to the invention include the absorption of large quantities of heat at low cost and a low temperature difference between the heat source and storage system. Both of these characteristics are desirable, by way of non-limiting example, for energy production from heat engines, which require the expulsion of heat in proportion to the power generated and the efficiency of such engines increases as the temperature difference decreases.

When used in conjunction with such engines, systems according to the invention are best understood as storing the electrical energy used to freeze the solid material and then releasing that energy to increase the power output of the heat engine. While the round trip efficiency of this process is less than 100%, as required by thermodynamic principles, the storage system still fulfills a valuable purpose by enabling electrical energy to be stored when it is inexpensive to produce and recovered (through an external heat engine) when generation sources are in short supply.

Referring to the drawings, components of the energy storage systems shown in FIGS. 1-6 and discussed below are coupled by piping, conduits, tubing or other structures of the type known in the art suitable for defining a fluid path (or circuit) and carrying the working fluids and heat transfer fluids along the paths illustrated in the drawings and described below. The path and those structures are depicted as tubes in FIGS. 1 and 4 and by solid lines and directional arrows in FIGS. 3 and 6 as per convention.

Figure 1:
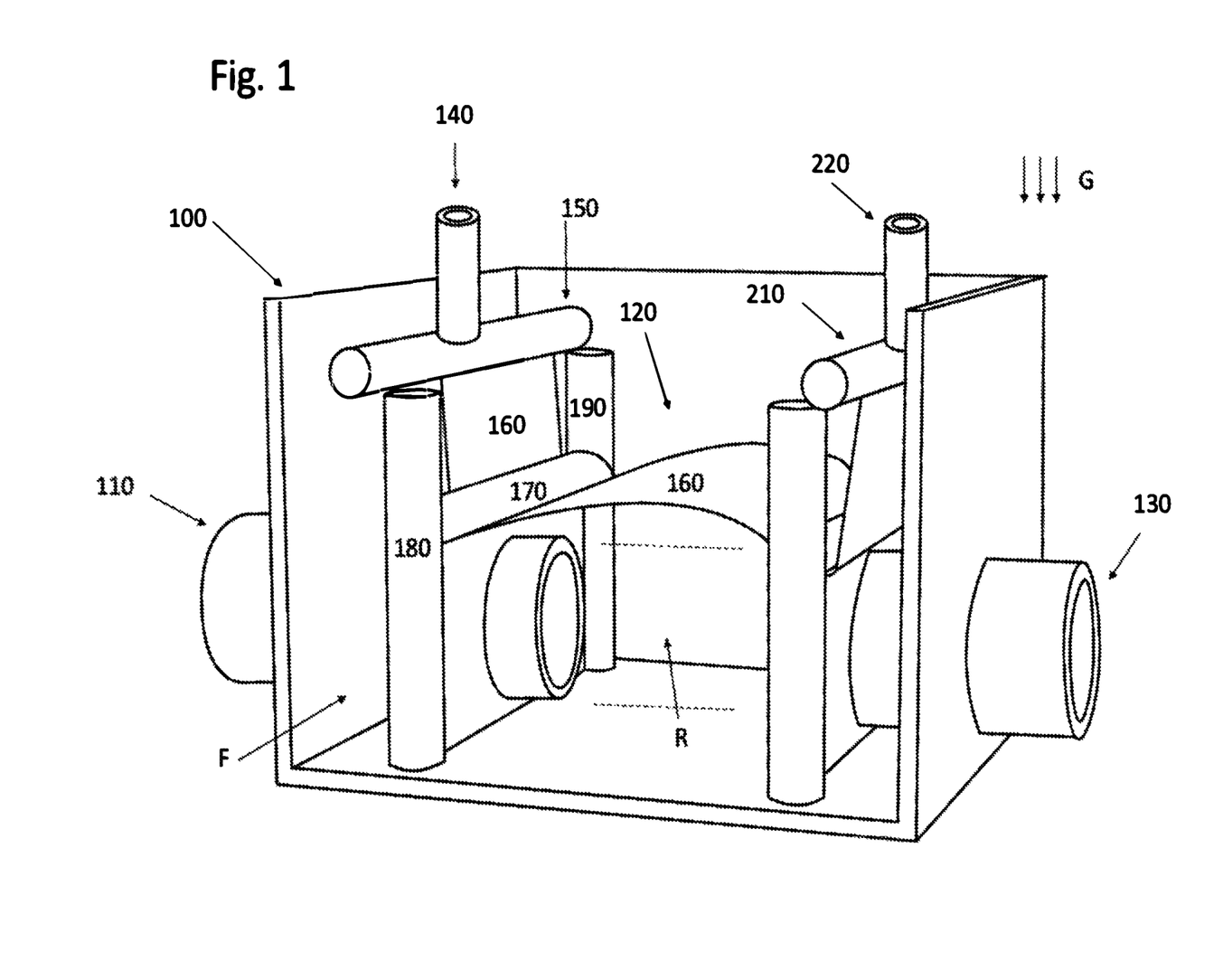
FIG. 1 is a cutaway view of an embodiment of the invention wherein the cavity is supplied with solid phase material through an external pump.

FIG. 1 is a cutaway view of a system according to the invention including a container 100, the inside of which defines a cavity 120 having an inlet and outlet serviced by pipes 110 and 130, respectively, and in which a heat transfer surface 160 is disposed. The container 100 can also include one or more headers 150, 210, supports 170, pipes 110, 130, 220, and other infrastructure of the type shown in the drawing and discussed below. Though heat transfer surface 160, supports and columns 170-190, and headers 150, 210 are shown in the drawing as separate structures that are mostly if not wholly contained in cavity 120 and container 100 in the illustrated embodiment, other embodiments may vary in one or more of these regards. For example, one or more of those elements 150-210 maybe disposed at least partially external to the container 100 and/or cavity 120 and/or integral thereto. Likewise, though pipes 110, 130 and 220 are shown in the drawing as separate structures that are largely disposed outside cavity 120 and container 100 in the illustrated embodiment, other embodiments may vary in one or more of these regards: for example, one or more of those elements 110, 130 and 220 maybe integral to container 100 and/or disposed more fully in it and/or cavity 120. The foregoing is likewise true of like components and structures in the embodiment of FIG. 4.

The container 100, which is shown here with the front surface cut away to reveal the configuration of the components contained therein, is fabricated, for example, as shown in the drawing, and may comprise metal, plastic, ceramic and/or other suitable material known in the art as adapted in accord with the teachings hereof to define a cavity 120 suitable to contain the working fluid F and one or more of elements 110, 130-220. In operation, the cavity 120 of container 100 is sufficiently filled with working fluid (in its liquid form alone or in combination with its solid form) so that the level of the liquid is above surface 160.

The working fluid of the illustrated embodiment is water. However, those skilled in the art will appreciate that other substances—particularly, those that experience phase changes in the operating ranges of the illustrated system—may be used for such purpose, as evident from the teachings hereof, may be used instead or in addition. In the discussion that follows, the working fluid is often referred to as "water" for convenience, although (as just noted) it may comprise other substances as well or in addition. Likewise, the condensed or solid form of that fluid is often referred to as "ice," regardless of whether it is a solid phase of water or another working fluid composition.

Pipes 110, 130 comprise conduits, piping, tubing or other structures (collectively, "pipes") of the type known in the art as adapted in accord with the teachings hereof to carry the working fluid in its liquid and/or solid forms to and/or from the cavity 120. Those pipes may comprise metal, plastic, ceramic and/or other materials known in the art suitable for such purposes, all as adapted in accord with the teachings hereof.

Pipe 110 is physically coupled to container 100 and fluidly coupled to cavity 120, for example, as shown in the drawing, to define a port through which a slurry of working fluid and its ice—known as "pumpable ice"—are inlet to the cavity 120. In embodiments in which the density of the working fluid is greater than that of its ice (or solid form), the pipe 110 is coupled to the container 100 and cavity 120 such that the slurry is inlet in a region R below heat transfer surface 160. This insures that, as it rises in the working fluid contained in the region 120 during the charging phase of operation, the ice component of the inlet slurry can be captured and contained by transversely disposed heat transfer surface 160, thereby, facilitating continuous contact melting during the discharge phase, as discussed elsewhere herein. Conversely, in embodiments in which the density of the working fluid is less than that of its ice, the pipe 110 is coupled to the container 100 and cavity 120 such that the slurry is inlet in a region R above heat transfer surface 160. This likewise insures that, as it sinks in the working fluid contained in the region 120, the ice component of the inlet slurry can be captured and contained by surface 160, thereby, facilitating continuous contact melting. As used here, and elsewhere herein, terms like "above," "below," "rise," "sink" and so forth are used per convention to define directionality and/or relative position vis-à-vis the gravitational field G in which the system is disposed.

Figure 3:
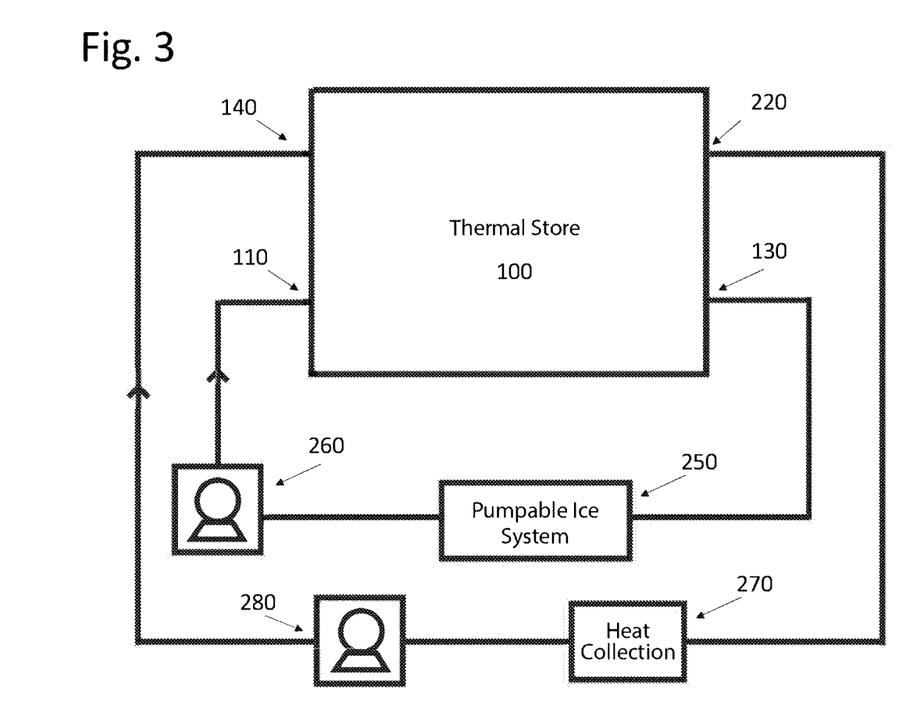
FIG. 3 is a system flow diagram showing the connection of the thermal store to an external solid phase pump and heat source in an embodiment of the invention.

Pipe 130 is physically coupled to container 100 and fluidly coupled to cavity 120 in order to define a port through which working fluid is outlet from the cavity 120 and container 100, e.g., when displaced by the slurry entering container 100 through pipe 110. Like the port provided by pipe 110, the port provided by pipe 130 is disposed, e.g., in region R, below the heat transfer surface 160 in embodiments where the working fluid is more dense than its ice; otherwise, the port provided by pipe 130 is disposed above surface 160. Pipe 130 fluidly connects the cavity 120 to a pumpable ice machine and/or other apparatus that forms part of an external fluid circuit as illustrated in FIG. 3 and described below.

Heat transfer surface 160, which is disposed in the cavity 120 transverse to the gravity field G, transfers to the ice floating in the working fluid and captured by surface 160 heat from a heat transfer medium that is thermally coupled to the surface 160. As noted elsewhere, the heat transfer surface 160 is disposed above the region R where that ice is inlet to the cavity 120, if the ice is less dense than the working fluid; otherwise, it is disposed below that region R. As used herein, the term "transverse" means across, and is used in contradistinction, for example, to the term "aligned." In the illustrated embodiment, the heat transfer surface is transverse in the sense that it is horizontal to—or, more generally, disposed at an oblique angle to—the gravity field and, therefore, captures the ice as it floats upward (or downward) in the working fluid in the charging phase of operation of the system and maintains contact with it during the melting or discharge phase of operation.

To facilitate its capture of ice inlet in the aforesaid region and to prevent it from reaching the surface of the working fluid (or the floor of the cavity, in the event the ice is more dense than the working fluid), the surface 160 can include one or more concavities (or other recesses) that open toward region R. In the illustrated embodiment, this is effected via cupping of the heat transfer surface 160 in the direction of the region R. To further facilitate capture of the ice and insure that it remains in thermal contact with the heat transfer surface 160, that surface 160 is preferably disposed below a surface of the working fluid in the cavity 160, if the ice is less dense than the working fluid, and otherwise is disposed above a bottom of the cavity 120.

In the illustrated embodiment, surface 160 comprises extruded aluminum, although other metals or other materials such as plastics, ceramics, composites and/or other suitable material known in the art as adapted in accord with the teachings hereof may be used instead or in addition—though, thermally conductive materials are preferred in order to assure heat transfer between the solid working fluid (ice) and the heat transfer material—which, in the illustrated embodiment, is a liquid such as isobutane, although the selection of other materials, liquid, gas and/or solid is within the ken of those skilled in the art in view of the teachings hereof.

Figure 2:
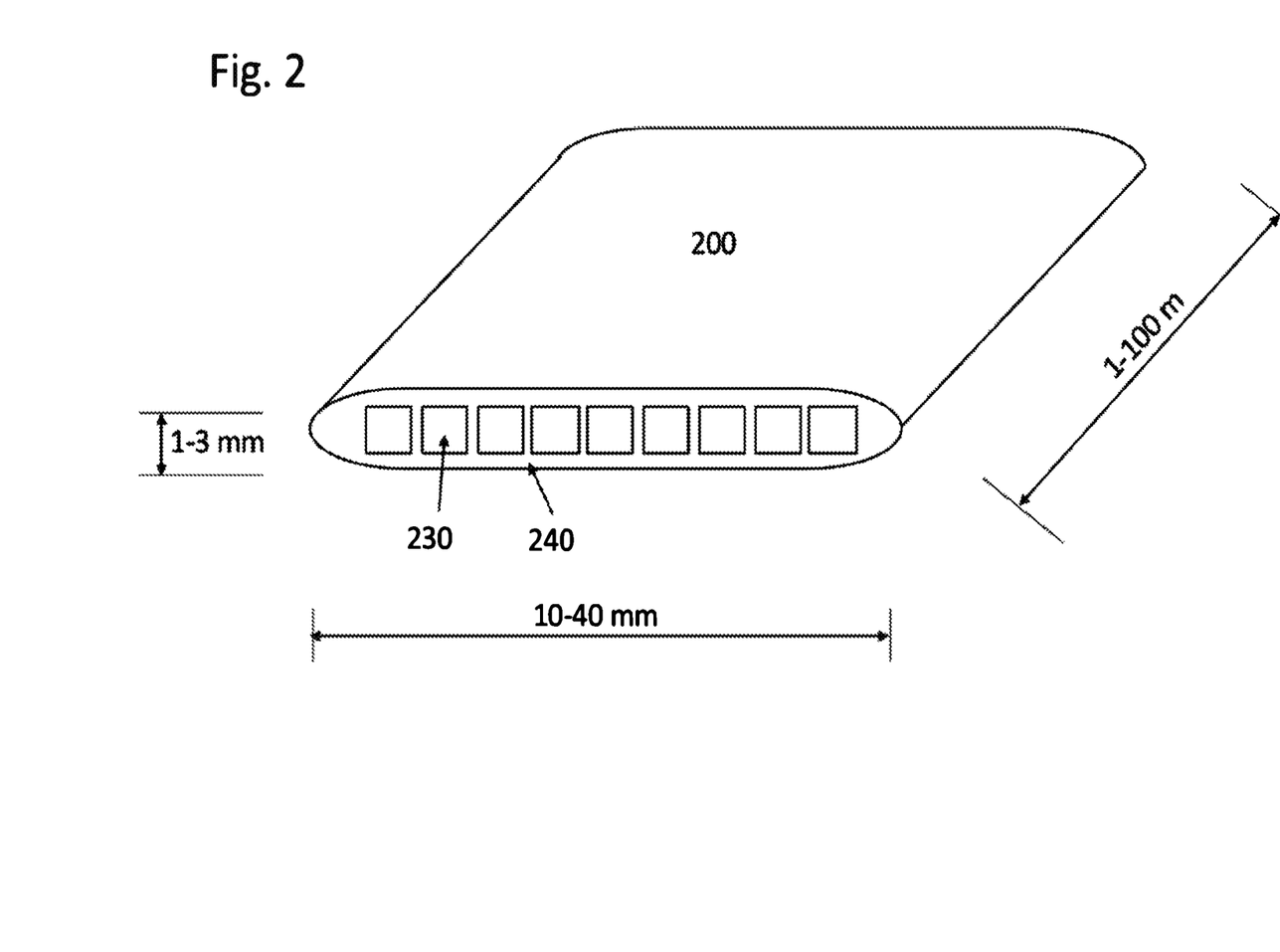
FIG. 2 is a drawing of aluminum micro-channel, a structured material that can be used as the heat transfer surface in an embodiment of the invention.

To facilitate heat transfer between the ice and the heat transfer material (or, more specifically here, heat transfer fluid), heat transfer surface 160 of the illustrated embodiment comprises multiple parallel channels arrayed in a planar configuration. In the illustrated embodiment, the parallel channels are formed by extrusion of aluminum, although other channel-forming techniques be used instead or in addition. An example of an extruded aluminum tube is illustrated in FIG. 2 with typical dimensions. Also, in FIG. 2, item 230 is a channel formed in the extruded aluminum that extends throughout the length of the material. Item 240 is the continuous aluminum structure that bounds the empty channels.

Support and other infrastructure of the illustrated embodiment is shown in the drawing and discussed below. It will be appreciated that this is by way of non-limiting example and that other configurations of support/infrastructure may be used instead or in addition, all as is within the ken of those skilled in the art in view of the teachings hereof. Illustrated pipe 140 connects the storage system 100 to an external fluid circuit for the heat transfer fluid that will circulate through the heat transfer surface. It terminates in header 150. Header 150 distributes the heat transfer fluid from pipe 140 across the width of the heat transfer surface 160 to enable a uniform flow of heat transfer fluid. Returning to FIG. 1, the heat transfer surface 160 is mechanically connected to horizontal support 170. The surface wraps under support 170 and emerges on the other side where the heat transfer surface serves as the upper bounding surface to cavity 120. The horizontal support 170 is mechanically connected to columns 180 and 190. These columns enable horizontal support 170 to resist the vertical buoyant forces from solid phase material trapped under surface 160. A similar configuration of a horizontal support and vertical columns is used to support the other side of the heat transfer surface 160. The heat transfer surface 160 connects to header 210 which consolidates the flow of the heat transfer fluid from 160 into a single tube. The header 210 connects to pipe 220 which provides an external port for circulating the working fluid.

The operation of the thermal storage system of FIG. 1 is discussed below in connection with FIG. 3, which shows the external connections, the components, and flows through those components of an exemplary fluid circuit of which the thermal store may form a part. Operation of those components—and, more generally, the pumps, valves and other active components illustrated in the drawings hereof—in the manner discussed herein, e.g., for purposes of charging or discharging the system 100, may be effected "by hand" by an operator (not illustrated), by machine, e.g., by a digital data processor, PLC or other control device or combination thereof (not illustrated), or by a combination of man and machine, all as per convention in the art as adapted in accord with the teachings hereof.

The process of charging the system 100 starts with pumpable ice system 250 that condenses working fluid received from the cavity via pipe 130 into an ice and, more particularly, an ice/fluid slurry. To this end, the pumpable ice system 250 may be driven by electrical power, though, in other embodiments alternative forms of power may be employed. Indeed, in environments in which excess ice is available (e.g., as a byproduct of other processes, natural or otherwise), that ice may be used in lieu of using a pumpable ice system, or the like, to create it.

Regardless, pumpable ice systems are commercially available products that produce a mixture of ice and water that can be conveyed with standard pumping technologies. Those skilled in the art will appreciate that other components or combinations of components may be used instead of or in addition to illustrated pumpable ice system 250 to generate ice from the working fluid for reintroduction into the cavity 120. In the illustrated embodiment, the pumpable ice system connects to pump 260. The pump conveys the mixture of ice and water to pipe 110 which is an inlet to the thermal store. Pipe 110 conveys the ice/water mixture into the thermal store 100 that was illustrated in FIG. 1. Note that pipe 110 in FIG. 3 corresponds to pipe 110 in FIG. 1. As the ice/water mixture is pumped into the thermal store 100 and, more particularly, its cavity 120, fluid exits the thermal store through pipe 130 in FIG. 3. Note that pipe 130 in FIG. 3 corresponds to pipe 130 in FIG. 1. Pipe 130 connects back to the pumpable ice system 250 in FIG. 3 to complete the fluid circuit.

To deposit heat into the thermal store or, put another way, to discharge the system, the heat collection system 270 absorbs heat from an external source and transmits it to the heat transfer fluid circulating through fluid circuit components 270, 280, and 100. The external source may be industrial, commercial or otherwise, as noted previously. The heat transfer fluid, which as noted above may comprise isobutane or otherwise, exits the heat collection system 270 and enters pump 280. The pump conveys the heat transfer fluid to the thermal store 100 through pipe 140. Pipe 140 in FIG. 3 corresponds to pipe 140 in FIG. 1. It conducts the heat transfer fluid into the thermal store where it can deposit thermal energy and melt the solid phase material. The heat transfer fluid exits the thermal store 100 through pipe 290 which corresponds to pipe 290 in FIG. 1. From there, the heat transfer fluid returns to the heat collection system 270 to complete the fluid circuit.

The combination of the two cycles illustrated in connection with FIG. 3 provides a way to charge the thermal store with solid phase material and to discharge thermal energy into the thermal store.

Figure 4:
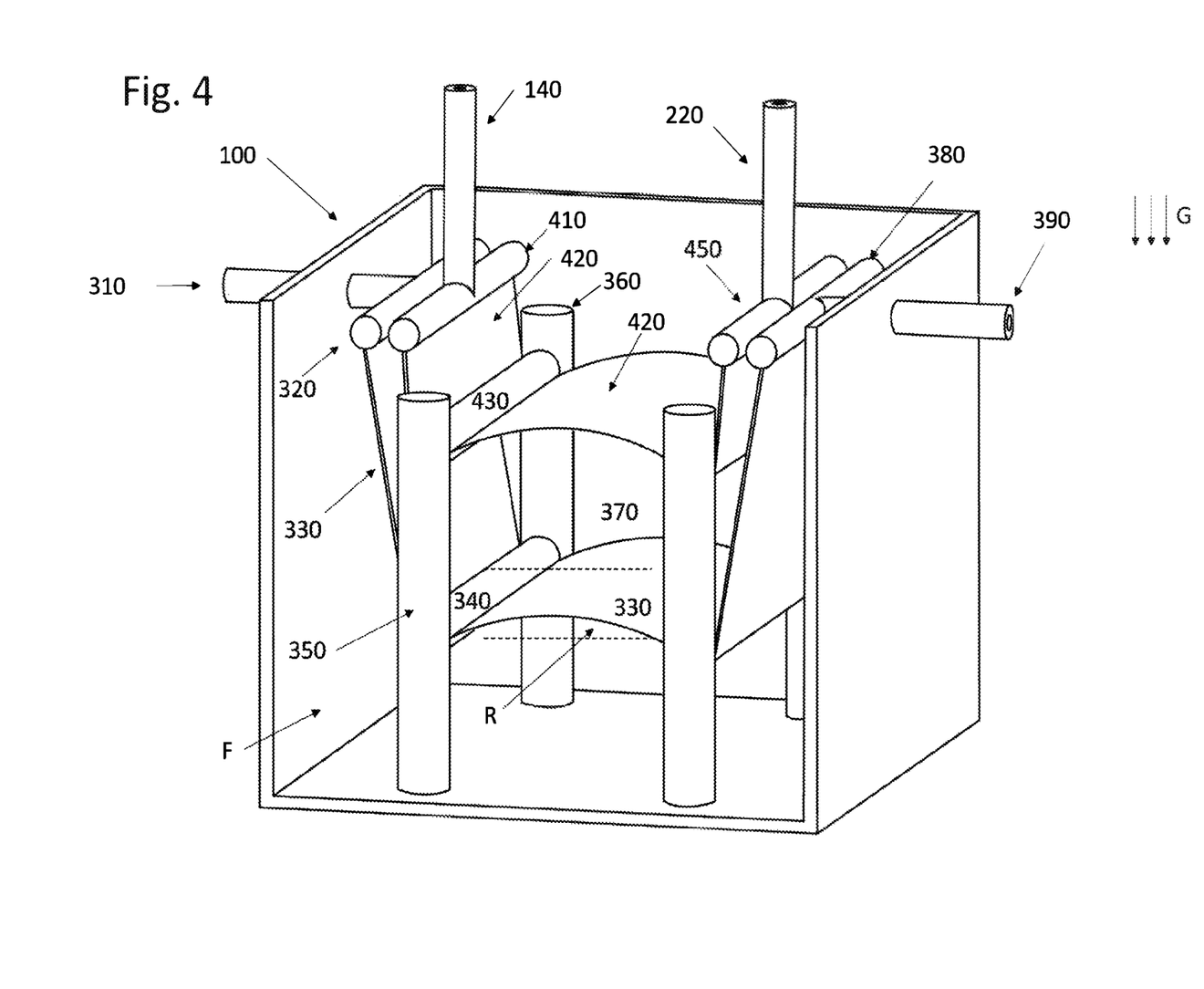
FIG. 4 is a cutaway view of an embodiment of the invention wherein the cavity is supplied with solid phase material formed on a condensing surface.

An alternative embodiment is illustrated in FIG. 4. That embodiment is constructed and operated in like manner to that of FIG. 1, discussed above, subject to the variances discussed below.

In the embodiment of FIG. 4, the solid phase material is generated by condensing the working fluid onto a condensing surface rather than pumped in to the cavity as in FIG. 1. FIG. 4 is a cutaway view of a container enclosing a cavity, a heat transfer surface and a condensing surface. As above, the front surface has been removed to reveal the contents. In this embodiment, the container 100 is filled with the working fluid F to a level above the heat transfer surface 420.

In this embodiment, the condensing surface creates the solid phase material for the storage system. The components devoted to the condensing surface are described next. Pipe 310 connects the thermal store to the external circuit for the heat transfer fluid and conveys the fluid through the walls of container 100 to header 320. Header 320 distributes the flow of heat transfer fluid across the width of the condensing surface 330. In this embodiment, the condensing surface 330 is composed of strips of aluminum microchannel of the kind illustrated in FIG. 2 and discussed above. The condensing surface wraps under horizontal support 340 and forms the lower surface of cavity 370. The condensing surface 330 connects to the header 380. The horizontal support 340 is supported by columns 360 and 350. The header 380 consolidates the heat transfer fluid from the condensing surface and conveys it to pipe 390. Pipe 390 conducts the heat transfer fluid through the wall of container 100 to an external fluid circuit.

Moving now to the components in the heat transfer surface, pipe 140 conducts heat transfer fluid for the heat transfer surface into the thermal store. It connects to header 410. Header 410 distributes the heat transfer fluid along the width of the heat transfer surface. The header connects to the heat transfer surface 420. In this embodiment, the heat transfer surface 420 is also composed of extruded microchannel material as illustrated in FIG. 2. The heat transfer surface is supported from above by the horizontal member 430. The heat transfer surface also extends over the cavity 370 where it forms a surface that contains the solid phase material.

Turning to support structures and infrastructure, the horizontal member 430 is fixed in place by columns 350 and 360. These columns provide structural support to the horizontal member 430 to resist the buoyant force exerted on the heat transfer surface 420 by the solid phase material. The heat transfer surface is supported on the opposite side by a similar combination of a horizontal support and a pair of columns. The surface connects to the header 450. The header 450 consolidates the flow of heat transfer fluid from the heat transfer surface. It connects to pipe 220. Pipe 220 conveys the heat transfer fluid out of the thermal storage system. It provides a connection point for external fluid circuits that supply heat transfer fluid.

Figure 5:
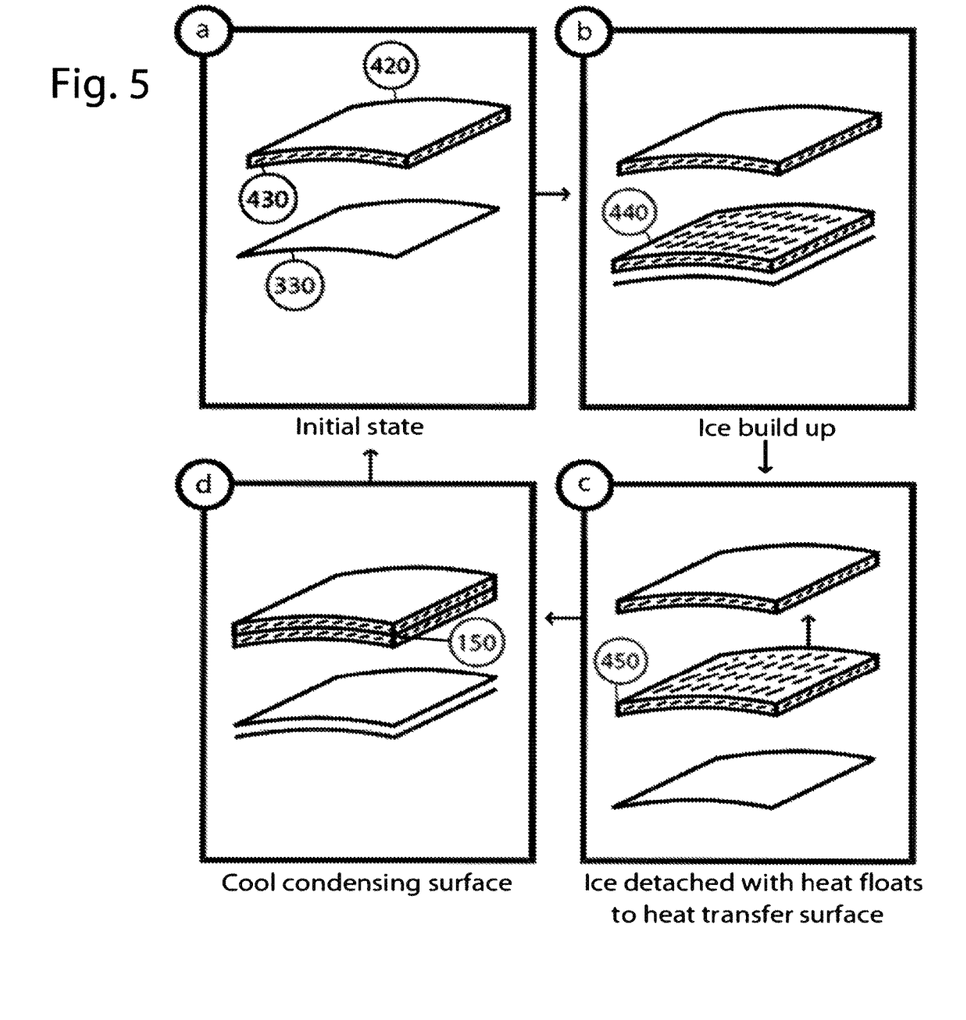
FIG. 5 depicts the cycle for forming solid phase material on a condensing surface in an embodiment of the invention.

The operating steps of the charging phase for the production of solid phase material in this embodiment are illustrated in FIG. 5.

In the charging phase, production proceeds through a cycle of steps that enable an arbitrary quantity of solid phase material to accumulate under the heat transfer surface contained only by the geometrical limits of the system.

The cycle begins with step (a) where there is no material on the condensing surface 330 and where the heat transfer surface 420 may have some accumulated solid phase material 430. Note that condensing surface 330 in FIG. 5 corresponds to the portion of the condensing surface 330 in FIG. 4 that lies in region R. Similarly, heat transfer surface 420 in FIG. 5 corresponds to the portion of heat transfer surface 420 in FIG. 4 above region R that captures floating ice.

Returning to FIG. 5, the cycle proceeds to step (b) where an ice sheet 440 forms on the condensing surface by circulating heat transfer fluid through the surface at a temperature below the freezing point of the material. As solid phase material develops on the surface, the heat transfer from the working fluid into the heat transfer fluid begins to decline because the heat must conduct through the accumulated solid phase material. In the preferred embodiment, this accumulation would be limited to approximately 1 cm of solid ice material on the condensing surface. Having reached that thickness, the cycle proceeds to step (c). In this step, the temperature of the circulating heat transfer fluid is increased to a level above the melting point of the solid phase. Melting occurs at the interface between the condensing surface and the accumulated solid phase layer 450. When the layer is sufficiently melted, the solid phase material detaches from the condensing surface because of its buoyancy and it rises through the working fluid and comes to rest under the heat transfer surface.

The accumulated solid phase material is illustrated as item 460 in step (d) of the cycle. In this phase of the cycle, the temperature of the condensing surface is reduced through the action of the heat transfer fluid which is now supplied at a temperature below the freezing point of the working fluid.

Once the condensing surface as returned to its initial temperature, the cycle returns to step (a) and repeats until sufficient solid phase material has accumulated.

Figure 6:
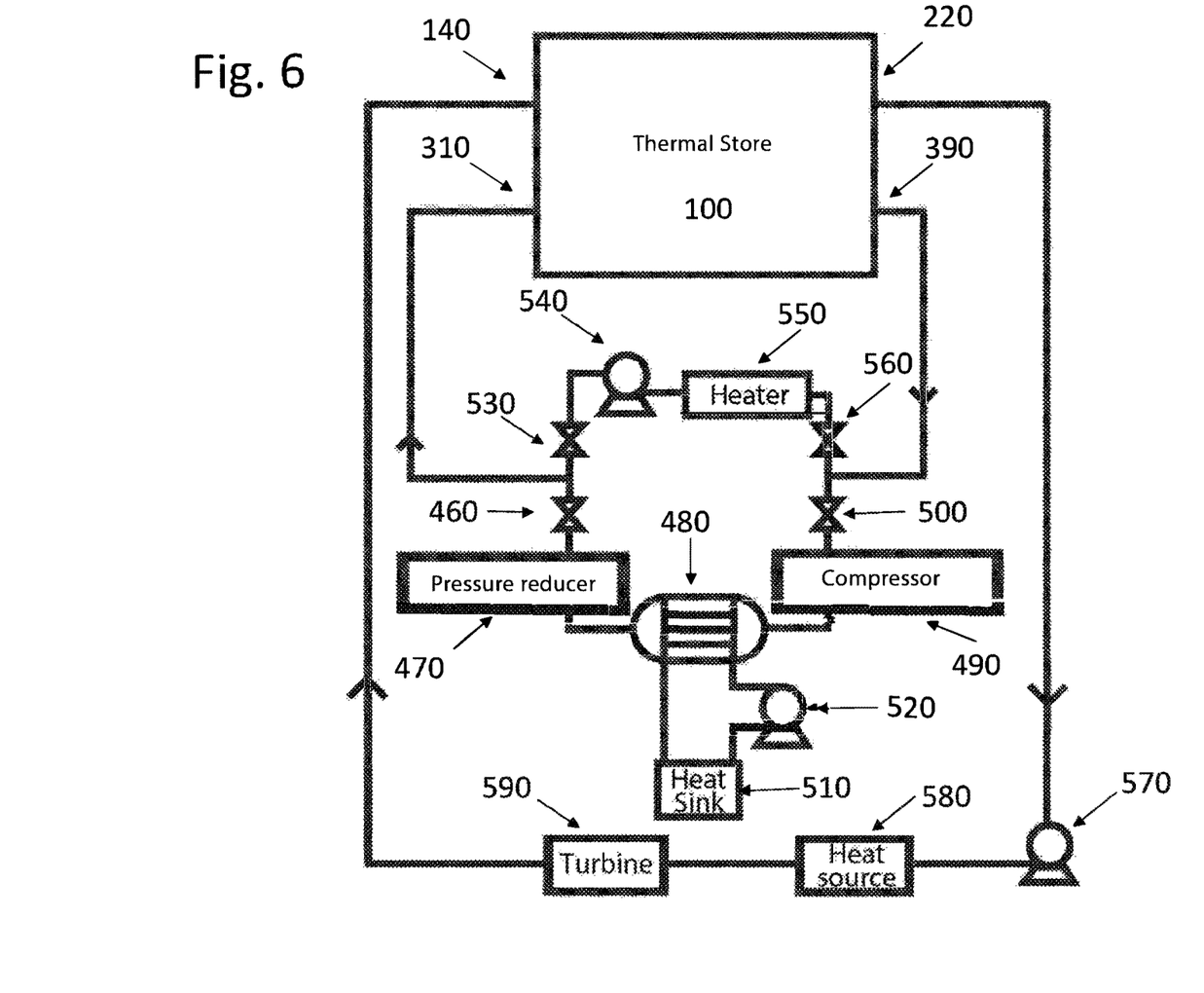
FIG. 6. is a system flow diagram showing interoperability of the thermal store of FIG. 4 with heating and cooling sources in an embodiment of the invention.

The system components and interconnections required to implement the cycle in FIG. 5 are illustrated in the schematic diagram of FIG. 6. The thermal store 100 depicted in this drawing corresponds to that of the embodiment of the thermal store illustrated in FIG. 4. As above, operation of the illustrated components may be effected "by hand" by an operator (not illustrated), by machine, e.g., by a digital data processor, PLC or other control device or combination thereof (not illustrated), or by a combination of man and machine, all as per convention in the art as adapted in accord with the teachings hereof.

Starting with the transfer of heat into the heat transfer surface of the thermal store, the cooled heat transfer fluid exits the thermal store through pipe 220. This is the same pipe illustrated as item 220 in FIG. 4. In the embodiment illustrated in FIG. 6, pipe 220 connects to pump 570. The pump increases the pressure of the fluid and transmits it to the heat source 580. In the illustrated embodiment, the fluid is taken to be a liquid as it enters the pump.

The heat source 580 raises the temperature of the heat transfer fluid. In this embodiment, the heat source is a high temperature thermal storage unit. Other embodiments are possible including a boiler or a heat exchanger to remove waste heat from a process fluid such as steam. The fluid exits the heat source on its way to the turbine 590. In the preferred embodiment, the fluid is in a supercritical state. In other embodiments, the fluid could be in a superheated gaseous state or a mixed phase.

The turbine 590 ingests that heated heat transfer fluid and extracts mechanical work from the fluid by lowering the pressure. This simultaneously decreases the temperature of the fluid. Practitioners in the art will understand that multiple turbines in series combinations, parallel combinations or both could be used to extract mechanical work from the fluid. In the preferred embodiment, the fluid is in a low-pressure gaseous state as it exits the turbine and enters the thermal store 100.

In the thermal store, the latent heat of vaporization of the gas is extracted by melting the solid phase material that contacts the heat transfer surface in the thermal store. The extraction of heat causes the heat transfer fluid to condense into the liquid phase. The heat transfer fluid exits the thermal store through pipe 220 and completes the fluid circuit.

In conjunction with the aforementioned cycle, a cycle for creating solid phase material can be operated synchronously or asynchronously. The steps of this cycle were illustrated in FIG. 5. The corresponding fluid circuit begins with pipe 390 illustrated in FIG. 6. This pipe corresponds to pipe 390 in FIG. 4, as well. The heat transfer fluid conveyed through pipe 390 connects to valves 500 and 560.

Consider first steps (d), (a) and (b) of the cycle illustrated in FIG. 5. During these steps valves 500 and 460 are open and valves 560 and 530 remain closed. In this configuration, the components 480, 490, 500, 510, and 520 are operated according to the principles of a heat pump to reduce the temperature of the heat transfer fluid entering these components through valve 500 and exiting through valve 460. In this embodiment, the heat transfer fluid exiting valve 500 is in a gaseous state.

The fluid exiting valve 500 enters the compressor 490. In the compressor the pressure of the pressure and temperature of the gas are increased. From the compressor 490, the fluid enters the heat exchanger 480.

The heat exchanger 480 transmits the fluid from the compressor 490 to the pressure reducer 470. In addition, the heat exchanger removes heat from the fluid. In the preferred embodiment, the fluid condenses from a gaseous state to a liquid state as it traverses the heat exchanger. The heat from the fluid is transferred via the heat exchanger to a second fluid that is circulated through a second, independent fluid path in the heat exchanger. This path consists of the heat exchanger 480, the pump 520 and the heat sink 510. Together, these components form a fluid circuit that removes the heat from the fluid exiting the compressor 490 and entering the pressure reduced 470.

The heat sink 510 can be one of any devices known to those practiced in the art including a cooling tower, a passive radiator or a body of water.

Return to the liquid phase fluid exiting the heat exchanger and entering the pressure reducer 470. The pressure reducer in the illustrated embodiment is an energy recovery turbine. Other options are possible including a capillary tube or an adjustable valve. The fluid exiting the pressure reducer enters valve 460.

As described above, valve 460 is to remain open during parts (d), (a), and (b) of the cycle described in FIG. 5 while valve 530 remains closed. Thus, the fluid is conducted from valve 460 to pipe 310 where it enters the thermal store. Pipe 310 in FIG. 6 corresponds to pipe 310 in FIG. 4.

Inside the thermal store, the heat transfer fluid absorbs heat from the working fluid in the thermal store. In this embodiment, the heat vaporizes the heat transfer fluid entirely. The resulting gas phase material exits the thermal store through pipe 390 and thereby completes the fluid circuit for phase (d), (a), and (b) of FIG. 4.

For step (c) of the cycle in FIG. 4, valves 460, 500, 530 and 560 are configured in the opposite state. That is, valves 460 and 500 remain closed and valves 530 and 560 remain open. The fluid exiting port 390 now flows through valve 560.

Valve 560 conducts the fluid to the heater 550. The heater 550 raises the temperature of the fluid to a level above the melting point of the working fluid in the thermal store. In this embodiment the heater is an electric heating device. Other devices are possible including a heat exchanger that supplies heat from an alternative high temperature source.

The fluid exits the heater 550 and enters the pump 540. The pump conveys the fluid to valve 530. Per the above, valve 530 remains open during step (c) over the cycle in FIG. 4 while valve 460 remains closed. Thus, the fluid circulates from valve 530 to pipe 310 which connects to the thermal store.

Pipe 310 illustrated in FIG. 6 corresponds to pipe 310 in FIG. 4. This pipe conveys the working fluid into the thermal store. There, the additional heat supplied to the heat transfer fluid by the heater 550 in FIG. 6 melts a portion of the solid phase material that has formed on the condensing surface as illustrated in step (c) of FIG. 5.

The cooled fluid exiting the thermal store 100 through pipe 390 thus completes the fluid circuit for step (c) of FIG. 5.

When the system is constructed according to the schematic in FIG. 6 and operated according to the cycle in FIG. 5, the system will absorb electrical energy as it creates solid phase material. Then, when the heat engine is operated, the thermal store provides a fixed, low temperature heat sink that absorbs the rejected heat from the heat engine. This recovers a substantial portion of the electrical energy used to create the solid phase as increased power output from the heat engine. This output power can be used as mechanical energy or converted back to electrical energy through a generator.

Described above and illustrated in the drawings are systems and methods of operation meeting the objects set forth previously. It will be appreciated that the illustrated embodiments are only examples of the invention and that other embodiments differing from those shown and described herein are encompassed by the invention, as well. Thus, for example, while preceding examples describe some selected components of systems for thermal storage and retrieval according to the invention, it will be understood by those practiced in the art that other components may be included in the fluid paths of these system instead or in addition to those shown in the drawings and discussed above, including, for example, pressure and temperature sensors, safety valves, piping and fittings, filters, oil separation devices and other instruments needed to support the operation of the particular choices of components in the system. It will be further understood by those practiced in the art that components such as "pump," "pumpable ice machine," etc., may all be implemented by alternative devices providing like functions.

In view of the foregoing, what I claim is:

1. A thermal energy storage and retrieval system, comprising
   a cavity containing a working fluid,
   a condensing surface disposed in the cavity in thermal coupling with the working fluid, wherein the condensing surface repeats a plurality of times a cycle that includes steps of
   (a) cooling the condensing surface to form ice from the working fluid on the condensing surface, and
   (b) heating the condensing surface to detach ice buildup from the condensing surface to float in the working fluid,
   a heat transfer surface disposed in the cavity transverse to a gravity field and in thermal coupling with the ice that is formed from and floating in the working fluid,
   the heat transfer surface transferring to the ice heat from a heat transfer medium that is thermally coupled to the heat transfer surface,
   the heat transfer surface being disposed above, with respect to the gravity field, a region of the cavity where said ice is formed, if the ice is less dense than the working fluid, and otherwise being disposed below that region.

2. The thermal energy storage and retrieval system of claim 1, wherein the heat transfer medium is a fluid.

3. The thermal energy storage and retrieval system of claim 2, wherein the heat transfer medium is isobutane.

4. The thermal energy storage and retrieval system of claim 2, wherein the heat transfer medium flows through the heat transfer surface to exchange heat with the ice.

5. The thermal energy storage and retrieval system of claim 4, wherein the heat transfer surface comprises one or more channels through which the heat transfer medium fluid flows in thermal coupling with the ice.

6. The thermal energy storage and retrieval system of claim 1, wherein the working fluid is water.

7. The thermal energy storage and retrieval system of claim 1, wherein the heat transfer surface is disposed below a surface of the working fluid in the cavity, if the ice is less dense than the working fluid, and otherwise is disposed above a bottom of the cavity.

8. The thermal energy storage and retrieval system of claim 7, wherein the heat transfer surface includes at least one recess to capture ice of the working fluid floating in the working fluid.

9. The thermal energy storage and retrieval system of claim 8, wherein the at least one recess prevents the ice from reaching a surface of the working fluid, if the ice is less dense than the working fluid, and otherwise prevents the ice from reaching the bottom of the cavity.

10. The thermal energy storage and retrieval system of claim 1 operable in (i) a charging mode in which ice is aggregated within the cavity, and (ii) in a discharging mode in which heat from the heat transfer medium is transferred to the aggregated ice to cool the heat transfer medium and to convert the ice to working fluid.

* * * * *